(12) United States Patent
Knox

(10) Patent No.: US 7,242,286 B2
(45) Date of Patent: Jul. 10, 2007

(54) SEAT BELT TENSION INDICATOR

(75) Inventor: Matthew J. Knox, Romulus, MI (US)

(73) Assignee: Autoliv ASP, Inc., Ogden, UT (US)

( * ) Notice: Subject to any disclaimer, the term of this patent is extended or adjusted under 35 U.S.C. 154(b) by 322 days.

(21) Appl. No.: 10/646,276

(22) Filed: Aug. 22, 2003

(65) Prior Publication Data

US 2005/0040960 A1    Feb. 24, 2005

(51) Int. Cl.
*B60Q 1/00*    (2006.01)
(52) U.S. Cl. ............... 340/457.1; 340/665; 73/862.391
(58) Field of Classification Search ............ 340/457.1, 340/425.5, 815.4, 384.1, 665; 280/801.1; 73/862.391, 862.451, 862.381
See application file for complete search history.

(56) References Cited

U.S. PATENT DOCUMENTS

| | | | | |
|---|---|---|---|---|
| 5,154,446 | A * | 10/1992 | Blake .......................... | 280/808 |
| 5,871,063 | A * | 2/1999 | Young .......................... | 180/268 |
| 5,965,827 | A | 10/1999 | Stanley et al. .......... | 73/862.391 |
| 5,996,421 | A | 12/1999 | Husby ..................... | 73/862.451 |
| 6,209,915 | B1 | 4/2001 | Blakesley ................ | 280/801.1 |
| 6,311,571 | B1 | 11/2001 | Norton ................... | 73/862.637 |
| 6,400,145 | B1 | 6/2002 | Chamings et al. ..... | 324/207.26 |
| 6,405,607 | B2 | 6/2002 | Faigle et al. ........... | 73/862.391 |
| 6,447,010 | B1 | 9/2002 | Curtis et al. ............. | 280/801.1 |
| 6,450,534 | B1 * | 9/2002 | Blakesley et al. ....... | 280/801.1 |
| 6,508,114 | B2 * | 1/2003 | Lawson ....................... | 73/159 |
| 6,556,903 | B2 * | 4/2003 | Chinigo et al. ............... | 701/29 |
| 6,623,032 | B2 * | 9/2003 | Curtis et al. ................ | 280/735 |
| 6,829,952 | B2 * | 12/2004 | Stanley et al. .......... | 73/862.391 |
| 6,851,503 | B2 * | 2/2005 | Almaraz et al. ............ | 180/268 |
| 2004/0011277 | A1 * | 1/2004 | Barnes et al. ................ | 116/202 |
| 2005/0039965 | A1 * | 2/2005 | O'Neill ...................... | 180/268 |

FOREIGN PATENT DOCUMENTS

EP    0997358 A3    11/2001

* cited by examiner

*Primary Examiner*—Phung T. Nguyen
(74) *Attorney, Agent, or Firm*—Sally J. Brown; Brinks Hofer Glison & Lione

(57) ABSTRACT

The present invention provides an apparatus for determining a seat belt tension is within a proper range. The apparatus is designed to be easily adapted to existing vehicle safety belt systems. Three points of contact with the safety belt allow the apparatus to be used in portable applications including installing child seats. Generally, two of the contact points support the belt while the third contact point is accomplished using a member responsive to the tension of the seat belt. The response of the member is in communication with a device to indicate the amount of tension present in the seat belt. A visual or audible signal is provided to the operator when sufficient tension has been reached and maintained. The apparatus can be mechanical or electro-mechanical in nature. The apparatus provides the general public with the capability to periodically or continuously monitor the seat belt tension and can be used to secure a child seat alerting the operator when the belt tension is within or outside predefined installation limits.

28 Claims, 3 Drawing Sheets

SEAT BELT TENSION INDICATOR

FIELD OF THE INVENTION

The present invention relates to an apparatus for use in automotive applications, to determine if a seat belt tension is within a predetermined range.

BACKGROUND OF THE INVENTION

Automotive crash protection systems are well-known in the automotive industry. Crash protection systems generally fall into one of two categories; namely, active and passive restraints. Passive restraints include systems such as air bags where the deployment of the crash protection mechanism is initiated by the system. Active restraints, for instance manual type seat belts, are not deployed on initiative of the crash protection system, but are engaged by the operator. Both passive and active restraint systems are optimized to protect a range of adult occupant sizes. To service the need of protecting children in the event of a crash, child seats were developed to be used in conjunction with seat belt systems to properly restrain children. One of the most important parameters in installing child seats is the tension on the seat belt used to fasten the child restraint in the vehicle. However, the general public does not have a convenient means to determine if proper seat belt tension is provided upon installation of a child seat.

Typically, a seat belt system is provided for restraining a child seat having an automatic locking retractor (ALR) function. This mode causes the retractor to act as a one-way clutch, allowing the belt to be retracted but not extended from the retractor. Proper belt tension is achieved by feeding the webbing into the retractor, thus compressing the seat cushion until the proper tension level is achieved.

National statistics show that over 80% of the child seat installations made today are made incorrectly. It is estimated that over one third of incorrectly installed child seats are the result of improper seat belt tension. Seat belts in automobiles are designed to restrain the passenger within the vehicle. Sufficient belt tension is required to ensure that the child seat does not move, rock, or rotate out of the preferred installation position, and to ensure that the child seat operates properly in a dynamic crash event. Currently, child seat installations are judged acceptable based on a feeling, not a measurement. The general public is faced with the problem of not objectively knowing when adequate belt tension has been applied. Ideally, a system for measuring seat belt tension would be useable for existing vehicles without requiring that it be especially adapted for a specific vehicle design.

SUMMARY OF THE INVENTION

In satisfying the above need, as well as overcoming the enumerated drawbacks and other limitations of the related art, the present invention provides a tension indicator apparatus for determining a seat belt tension is within a predetermined range.

An embodiment of the present invention includes an S-clip and a displacement sensor. The vehicle seat belt is interwoven with the S-clip in a serpentine fashion. The S-Clip has three points of contact with the seat belt. Tension applied to the seat belt causes deformation of the S-clip, which is measured by a force sensing device. The force sensing device provides an output of the deformation and tension level.

A visual or audible signal is provided to the operator when sufficient seat belt tension has been reached and maintained. The force sensing device can be mechanical or electro-mechanical in nature. Additionally, the tension indicator provides the general public with the capability to periodically or continuously monitor the seat belt tension and can be used to secure a child seat alerting the operator when the belt tension is within predefined installation limits.

Child seats are purchased independent of automobiles and are often moved between vehicles. A significant benefit of the present invention includes that the apparatus is portable. The S-clip design allows the apparatus to be easily adapted to any existing vehicle safety belt systems.

Further objects, features and advantages of this invention will become readily apparent to persons skilled in the art after a review of the following description, with reference to the drawings and claims that are appended to and form a part of this specification.

DETAILED DESCRIPTION

Figure 1:
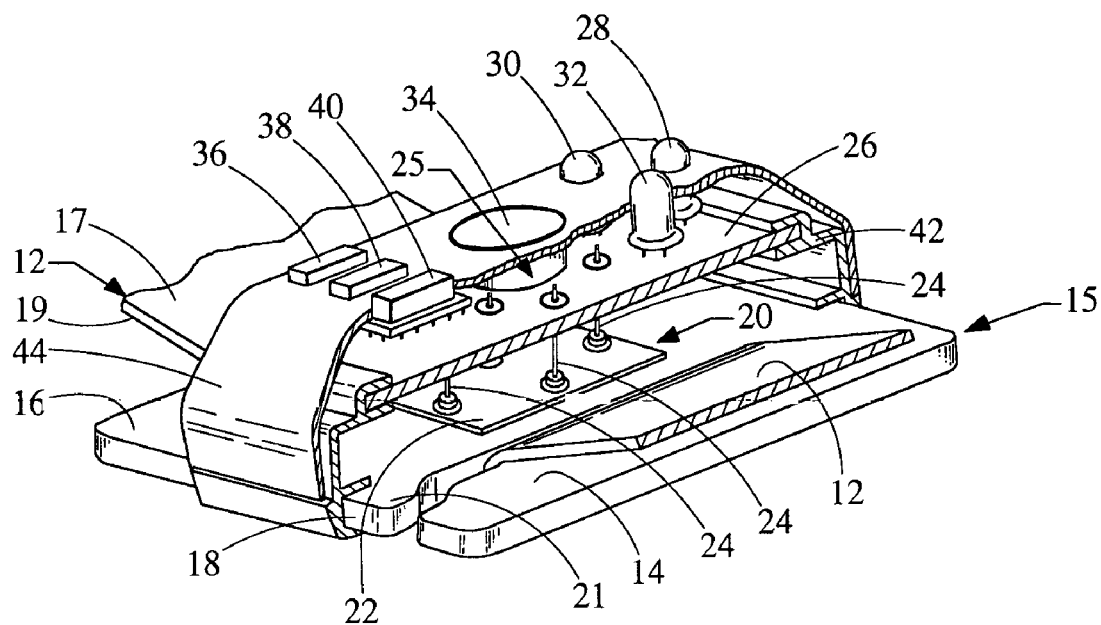
FIG. 1 is an isometric cut away view of the apparatus for measuring belt tension according to the present invention.
Figure 2:
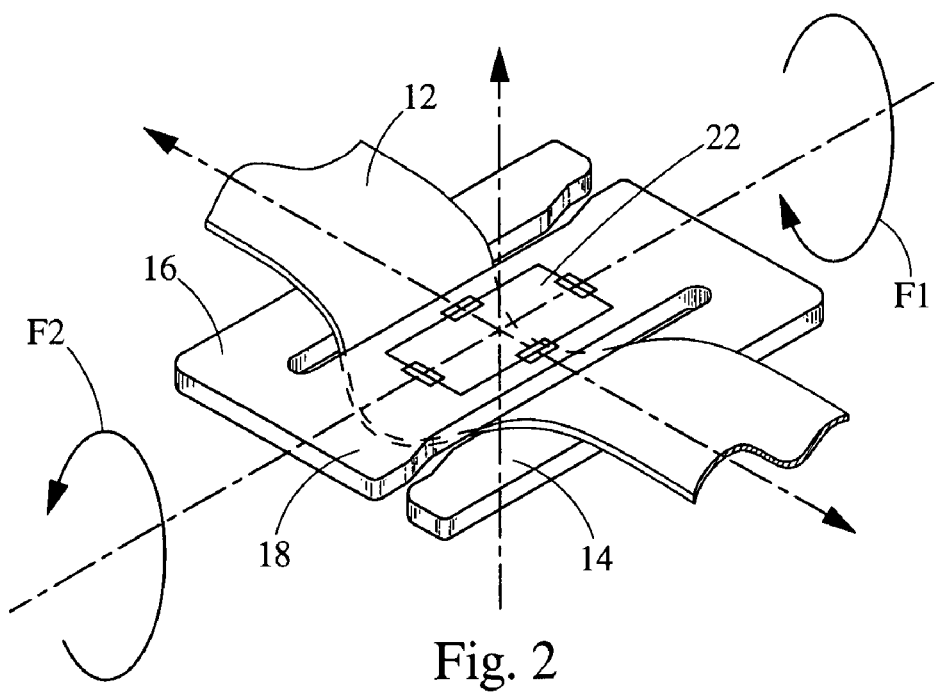
FIG. 2 is an isometric view of the apparatus for measuring belt tension illustrating the torsion created in the center section according to the present invention.

Referring now to FIGS. 1 and 2, an apparatus, specifically a seat belt tension indicator, adapted to determine if seat belt tension is within a predetermined range embodying the principles of the present invention is illustrated therein and designated at 10. As its primary components, the seat belt tension indicator 10 includes an S-clip 15 and a force sensing device 20.

As illustrated, the S-clip 15 includes first, second, and third sections or members, in the form of first and second legs 4 and 16, and center section 18. The first leg 14 and second leg 16 of the S-clip 15 extend from opposite ends of center section 18. The center section 18 is located between the first leg 14 and the second leg 16. The S-clip 15 is designed to have the belt 12 interwoven between the center section 18 and legs 14, 16 in a serpentine fashion. Each leg 14 and 16 forms a tooth 21 to retain the seat belt 12 in the S-clip 15. The first leg 14 and second leg 16 contact the bottom web surface 19 of the seat belt 12 while the base plate 18 contacts the top web surface 17 of the seat belt 12. Since S-clip 15 is flat, the belt 12 must follow a serpentine path as it is woven into the S-clip. The configuration of the S-clip 15 causes it to be exposed to deformation stress in response to the seat belt tension. Additionally, the configuration shown allows the tension indicator 10 to respond independent of any other mechanism contacting the seat belt 12.

As shown in FIG. 2, the attachment of the first leg 14 to the center section 18 at one end of the center section causes a first force F1 to be created by the tension in the seat belt 12. Conversely, the second leg 16 being attached to center section 18 on the opposite end causes the tension of the seat belt 12 to produce a second force F2 in a direction opposite the first force F1. The first and second forces F1 and F2 cooperate to create a torsion stress and resulting strain in the center section 18. The torsion in the center section 18 can be sensed using a torsion sensing device 20.

The force sensing device 20 includes a strain sensor element 22, an electronic assembly 25, and leads connecting the strain sensor element 22 to the electronic assembly 25. Strain sensor element 22 creates an electrical signal based on the torsional strain of the center section 18. A conventional resistance type strain gage may be used in this application. The electrical signal is communicated to the electronic assembly 25 through the leads 24.

The leads 24 are connected to a printed circuit board 26 included in the electronic assembly 25. The electrical signals are communicated through the printed circuit board 26 to an integrated circuit (not shown). The integrated circuit interprets the electronic signals and determines whether the seat belt 12 has a tension in a predetermined range. If the seat belt has a tension within the predetermined range, the integrated circuit will illuminate a green LED 32, otherwise the integrated circuit will illuminate a red LED 30. Similarly, the integrated circuit can communicate an electrical signal with a tone generator 34 to create an audible alert indicating whether proper tension exists in the seat belt 12. If the electrical signal cannot be interpreted by the integrated circuit, a yellow fault LED 28 will be illuminated. A button 40 is also coupled to the integrated circuit for clearing faults or providing a zero/reference tension. Additional buttons 36, 38 are also provided to power on or power off the electronic assembly 25. A bracket 42 is attached to the S-clip 15 to support the electronic assembly 25. The bracket 42 prevents stress from being introduced into the leads 24 connecting the strain element 22 to the printed wiring board 26. A cover 44 is attach to the bracket 42 serving to protect the electronic assembly 25 from external environmental conditions.

Figure 3:
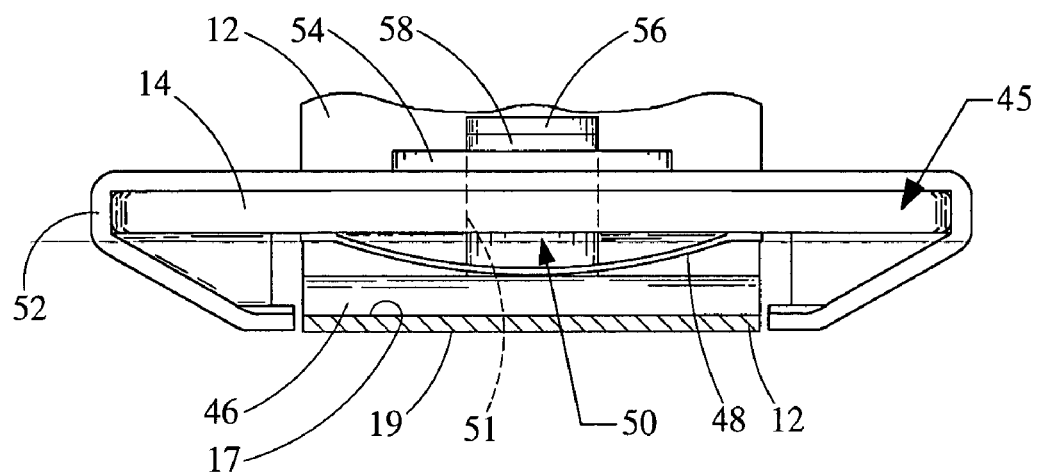
FIG. 3 is a side cut away view of a mechanical embodiment of the apparatus according to the present invention.

Now referring to FIG. 3, the present invention also provides for a mechanical implementation of the apparatus which does not require an electronic assembly. The mechanical implementation, incorporates an S-clip 45 substantially identical with that shown in FIGS. 1 and 2 having a first leg 14 and second leg (not shown). The responsive member 46 is shown as a guide plate 46. The seat belt 12 is interwoven between the two legs and the guide plate 46. The two legs contact the bottom web surface 19 of the seat belt 12 while the guide plate 46 contacts the top web surface 17 of the seat belt 12. The guide plate 46 is supported by a biasing member 48. The biasing member 48 is illustrated as a leaf spring 48. The leaf spring 48 biases the guide plate 40 away from the S-clip 45 and against the tension of the seat belt 12. The leaf spring 48 should be capable of providing between 30 and 50 lbs. of force to the guide plate 46. A button 50 is supported by the leaf spring 48 and translated as the tension of the seat belt 12 forces the guide plate 46 to compress the leaf spring 48.

A belt guide 52 is attached to the S-clip 45. The button 50 protrudes through a bore 51 in the center section of S-clip 45 and a belt guide 52. The belt guide 52 includes a lip 54 around the bore 51. The button 50 has a first colored ring 56 on the end of the button 50 opposite leaf spring 48. A second colored ring 58 is located adjacent to the first colored ring 56. When the tension in the seat belt 12 is less than the predetermined range, only the first colored ring 56 of the button 50 is visible over the lip 54. As the tension from the seat belt 12 results in the translation of the button 50, the second colored ring 58 becomes visible over the lip 54 indicating the seat belt 12 has a tension in the predetermined range.

Figure 4:
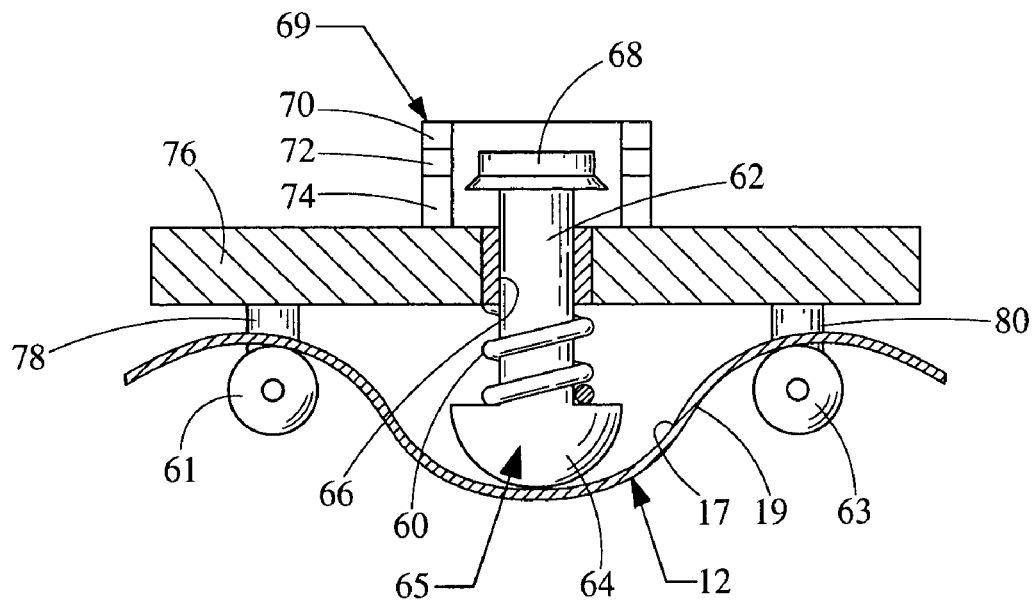
FIG. 4 is a side view of another mechanical embodiment of the apparatus according to the present invention.

Now referring to FIG. 4, another mechanical configuration of the present invention provides for a first member 61 and a second member 63 located to engage with the seat belt 12. The first and second member 61, 63 are shown as a first roller 61 and a second roller 63. The first roller 61 is attached to the bottom of a base plate 76 by a standoff 78. Likewise, roller 63 is attached to the bottom of the base plate 76 by a standoff 80. A third member 65 is located between roller 61 and roller 63. The third member 65 is shown as a pin assembly 65. The two rollers 61, 63 in cooperation with the pin assembly 65 forms an "S" shaped configuration such that the rollers 61, 63 are oriented parallel to each other but are attached to opposite ends of the base plate 76.

The seat belt 12 is interwoven between the two rollers 61, 63 and the pin assembly 65. The roller 61, 63 contacts the bottom web surface 19 of the seat belt 12 and the pin assembly 65 contacts the top web surface 17 of the seat belt 12. The pin assembly 65 includes a rounded head 64 for contacting the seat belt 12, a shaft 62 protruding through a bore 66 in the base plate 76, and a colored head 68 located on the top side of the base plate 76. A biasing member 60 is illustrated as a spring 60 surrounding the shaft 62. The spring 60 is compressed between the rounded head 64 and the base plate 76 to bias the pin assembly 65 against the seat belt 12. As the tension of the seat belt 12 increases, the pin assembly 65 translates causing colored head 68 to move away from base plate 76. A scale 69 is attached to the base plate 76. The scale 69 has a red section 74, a yellow section 72, and a green section 70. If the colored head 68 aligns with a red section 74, minimum tension is present in the seat belt 12. When the colored head 68 is aligned with the yellow section 72, average tension is present in the seat belt 12. However, when the colored head 68 is fully extended, the head 68 is aligned with the green section 70 indicating proper tension exists in the seat belt 12.

Figure 5:
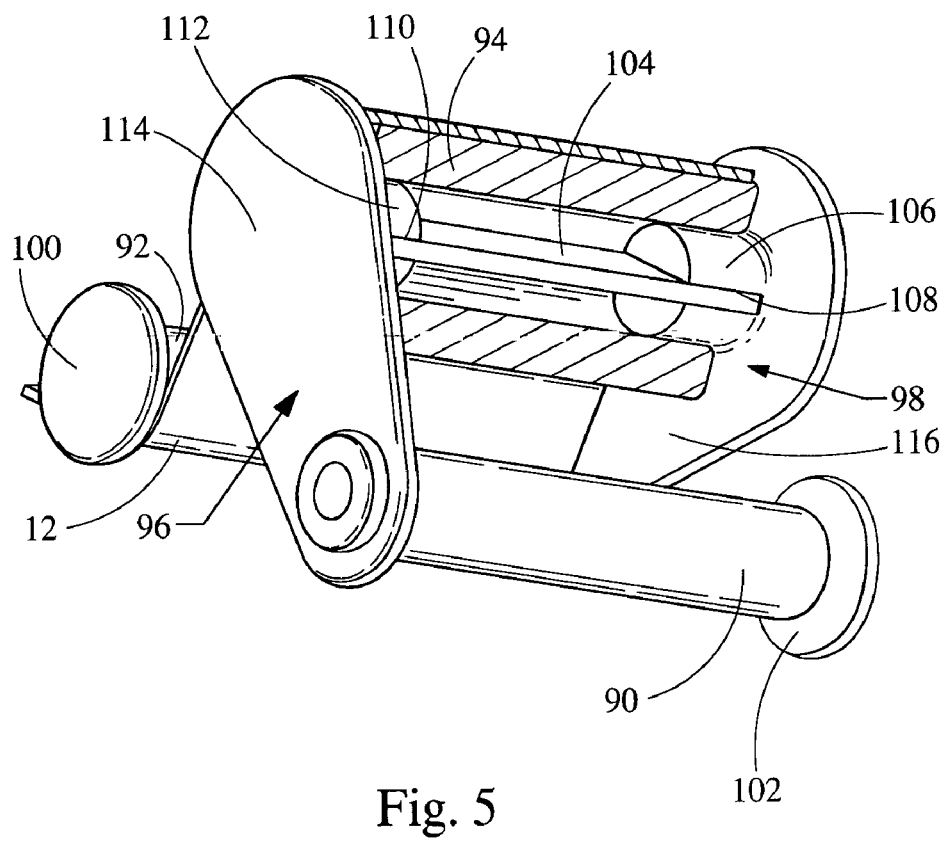
FIG. 5 is an isometric cutaway view of another mechanical embodiment of the apparatus according to the present invention.
Figure 6:
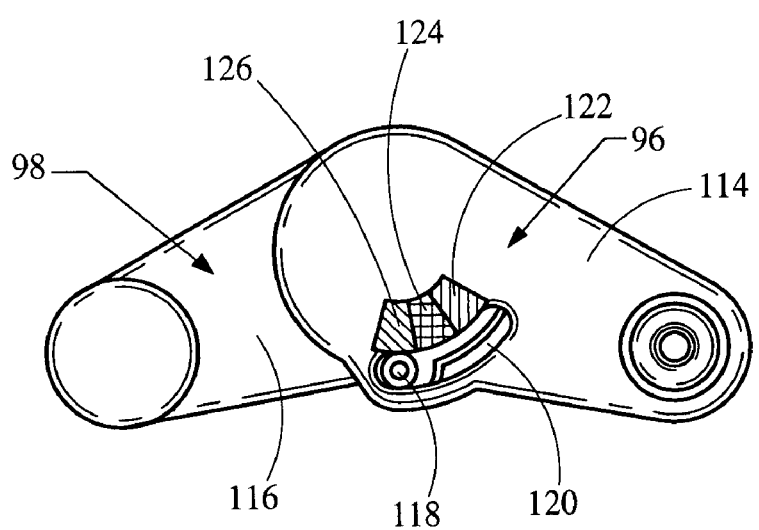
FIG. 6 is a side view of the mechanical embodiment illustrated in FIG. 5.

Now referring to FIGS. 5 and 6, another mechanical configuration of the present invention provides for a first member 90 and a second member 92 located to engage with the seat belt 12. The first and second member 90, 92 are shown as a first roller 90 and a second roller 92. The first roller 90 is attached to a base roller 94 by a first arm 96. Likewise, roller 92 is attached to the base roller 94 by a second arm 98. Similar to previous embodiments, the first and second roller 90, 92 in cooperation with the base roller 94 form an "S" shaped configuration. The first and second roller 90, 92 are oriented parallel to each other but are connected to the base roller 94 at opposite ends. The seat belt 12 is interwoven between the two rollers 90, 92 and the base roller 94. The first roller 90 and the second roller 92 contact the bottom web surface of the seat belt 12, while the base roller 94 contacts the top web surface of the seat belt 12. End caps 100 and 102 act to retain the seat belt 12 in alignment with rollers 90 and 92.

A biasing member 104 is shown as a torsional spring 104, however, other biasing members, for example a coil spring could be used. The torsional spring 104 is located inside the base roller 94. The first arm 96 has a hub 112 including a slot 110 for receiving the torsional spring 104. Similarly, the second arm 98 has a hub 106 including a slot 108 also for receiving the torsional spring 104. The first arm 96 includes a first plate 114. Similarly, the second arm 98 includes a second plate 116. The first and second plates 114, 116 are oriented parallel to each other but perpendicular to the base roller 94. Each plate 114, 116 pivots in opposite directions and relative to the amount of applied belt tension or load. The base roller 94 serves as the pivot center. The plates 114, 116 pivot outward as belt tension/load increases and pivot inward when it decreases.

Secured into the first plate is an indicator pin 118 that extends the length of the base roller 94 and through a slot 120 in the second plate 116. The second plate 116 has a red mark 122, a yellow mark 124, and a green mark 126 near where the indicator pin 118 extends through the second plate 116. The alignment of the pin 118 with the markings 122, 124, 126 indicates the level of belt tension or load. The indicator pin 118 aligning with the red marking 122 indicates insufficient load. The indicator pin 118 aligning with the yellow marking 124 indicates adequate load. While the indicator pin 118 aligning with the green marking 126 indicates sufficient load. The markings 122, 124, 126 are located relative to the amount of load and corresponding outward pivoting movement between the first and second plates 114, 116.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. An apparatus for alerting a motor vehicle operator that tension of a motor vehicle seat belt is within a predetermined range, and adapted to be fastened to the seat belt, the seat belt having a first and second web surface, the apparatus comprising:
   first and second members contacting the first web surface of the seat belt;
   a third member located between the first and second members and contacting the second web surface of the seat belt, the third member providing a response to the tension of the seat belt;
   a force sensing device coupled to the third member, the device being adapted to alert the operator when the response of the third member corresponds to the tension of the seat belt being within the predetermined range, the force sensing device including a manual input in communication with an integrated circuit to indicate when a reference tension is applied to the apparatus.

2. The apparatus according to claim 1, the force sensing device including an element adapted to sense a torsional load applied to in the third member, the torsional load being created in response to the tension of the seat belt.

3. The apparatus according to claim 2, the force sensing device including a printed circuit board in communication with the element.

4. The apparatus according to claim 1, wherein the first, second and third members form an S-clip, and the S-clip forms a tooth to retain the seat belt.

5. The apparatus according to claim 4, wherein the first member forms a first leg of the S-clip, the second member forms a second leg of the S-clip, the third member forms a center section of the S-clip.

6. The apparatus according to claim 1, the force sensing device including a light to provide a visual alert to the operator when the tension is within the predetermined range.

7. The apparatus according to claim 1, the force sensing device including a tone generator to provide an audible alert to the operator when the tension is within the predetermined range.

8. The apparatus according to claim 1, the force sensing device including a biasing member coupled to the third member.

9. The apparatus according to claim 1, wherein the third member is displaced in response to the tension in the seat belt.

10. The apparatus according to claim 1, wherein the first member includes a roller for contacting the seat belt.

11. The apparatus according to claim 1, wherein the third member is comprised of a pin assembly having a rounded head to contact the seat belt.

12. The apparatus according to claim 1, wherein the third member includes a roller for contacting the seat belt.

13. The apparatus according to claim 1, wherein the first, second, and third members include rollers contacting the seat belt.

14. An apparatus for alerting a motor vehicle operator that tension of a motor vehicle seat belt is within a predetermined range, and adapted to be fastened to the seat belt, the seat belt having a first and second web surface, the apparatus comprising:
   first and second members contacting the first web surface of the seat belt;
   a third member located between the first and second members and contacting the second web surface of the seat belt; the third member providing a response to the tension of the seat belt;
   a force sensing device coupled to the third member, the device being adapted to alert the operator when the response of the third member corresponds to the tension of the seat belt being within the predetermined range, wherein the force sensing device includes a visual indicator to alert the operator when the third member is displaced corresponding to a tension of the seat belt within the predetermined range, the visual indicator including a scale corresponding to a plurality of tension conditions.

15. The apparatus according to claim 14, wherein the first, second, and third member are oriented to form an S-clip.

16. The apparatus according to claim 15, wherein the S-clip has a tooth formed by at least one of the members to retain the seat belt.

17. The apparatus according to claim 15, wherein the first member includes a first leg of the S-clip, the second member includes a second leg of the S-clip, the third member includes a center section of the S-clip.

18. The apparatus according to claim 15, the device including a printed circuit board in communication with the element.

19. The apparatus according to claim 14, the visual indicator including a light to provide a visual alert to the operator when the tension is within the predetermined range.

20. The apparatus according to claim 14, the device further including a tone generator to provide an audible alert to the operator when the tension is within the predetermined range.

21. The apparatus according to claim 14, the device including a manual input to indicate when a reference tension is applied to the apparatus.

22. An apparatus for alerting an operator a tension of a seat belt is within a predetermined range, the seat belt having a first and second web surface, the apparatus comprising:
   a first member contacting the first web surface of the seat belt;
   a second member contacting the first web surface of the seat belt;

a third member located between the first and second members and contacting the second web surface of the seat belt, the third member being displaced in response to a tension in the seat belt;

a device coupled to the third member, the device being adapted to alert an operator when the displacement of the third member corresponds to the tension of the seat belt being within the predetermined range, the device including a visual indicator to alert the operator when the third member is displaced a distance corresponding to a tension of the seat belt within the predetermined ranger, the visual indicator including a scale corresponding to a plurality of tension conditions.

23. The apparatus according to claim 22, the device including a biasing member coupled to the third member.

24. The apparatus according to claim 22, wherein the biasing member biases the third member against the seat belt.

25. The apparatus according to claim 22, wherein the first member includes a roller for contacting the seat belt.

26. The apparatus according to claim 22, wherein the third member includes a rounded head to contact the seat belt.

27. The apparatus according to claim 22, wherein the third member includes a roller for contacting the seat belt.

28. The apparatus according to claim 22, wherein the first, second, and third members include rollers.

* * * * *